United States Patent
Hayne et al.

(10) Patent No.: US 11,488,230 B2
(45) Date of Patent: Nov. 1, 2022

(54) METHOD AND SYSTEM FOR ONLINE SHOPPING FOR SCHOOL SUPPLIES BASED ON GENERIC LISTS PROVIDED BY TEACHERS FOR SEARCHING AND SELECTION BY USERS

(71) Applicant: Target Brands, Inc., Minneapolis, MN (US)

(72) Inventors: Scott Hayne, Minneapolis, MN (US); George Tuan, Plymouth, MN (US)

(73) Assignee: Target Brands, Inc., Minneapolis, MN (US)

(*) Notice: Subject to any disclaimer, the term of this patent is extended or adjusted under 35 U.S.C. 154(b) by 178 days.

(21) Appl. No.: 15/223,300

(22) Filed: Jul. 29, 2016

(65) Prior Publication Data
US 2018/0033069 A1 Feb. 1, 2018

(51) Int. Cl.
*G06Q 30/06* (2012.01)
*G06Q 50/20* (2012.01)

(52) U.S. Cl.
CPC ..... *G06Q 30/0633* (2013.01); *G06Q 30/0631* (2013.01); *G06Q 30/0643* (2013.01); *G06Q 50/20* (2013.01)

(58) Field of Classification Search
CPC ......... G06Q 30/06–0645; G06Q 30/08; G06Q 50/01; G06Q 50/20
See application file for complete search history.

(56) References Cited

U.S. PATENT DOCUMENTS

| | | | |
|---|---|---|---|
| 8,429,026 B1 | 4/2013 | Kolawa et al. | |
| 10,169,798 B2* | 1/2019 | Ravikant | G06Q 30/0627 |
| 10,839,449 B2* | 11/2020 | Driscoll | G06Q 50/20 |
| 10,929,882 B2* | 2/2021 | Fuzell-Casey | G06Q 30/0224 |
| 2003/0167213 A1 | 9/2003 | Jammes et al. | |

(Continued)

OTHER PUBLICATIONS www.Teacherlists.com, a collection of webpage screen captures published from Nov. 27, 2014, to Jul. 4, 2015, retrieved from archive.org on Jul. 19, 2019, 15pp. (Year: 2015).*

(Continued)

*Primary Examiner* — Adam L Levine
(74) *Attorney, Agent, or Firm* — Merek, Blackmon & Voorhees, LLC

(57) ABSTRACT

Computer-implemented methods, computer program products and computer systems for facilitating a customer's online purchase of school supplies listed on one or more generic teacher school supply lists using an online store's website. The computer-implemented methods, computer program products and computer systems provide a user access to select one or more teacher's generic school supply lists from a plethora of generic school supply lists. Online retailer's products are indexed against items on the teacher's generic school supply list so that after user selection of a particular teacher's generic school list, the user is provided with one or more graphical user interfaces identifying all matching items of the retailer for a given teacher's school supply list. The customer is presented with one or more graphical user interfaces that allow the user to purchase the matching items. UPC codes can be used to index a retailer's product to a corresponding item on a teacher's generic school supply list.

20 Claims, 10 Drawing Sheets

(56) References Cited

U.S. PATENT DOCUMENTS

| | | | |
|---|---|---|---|
| 2011/0238527 A1* | 9/2011 | Smith-Bauer | G06Q 30/06 705/26.8 |
| 2011/0302060 A1* | 12/2011 | Cano | G06Q 30/06 705/27.1 |
| 2013/0282466 A1 | 10/2013 | Hampton | |
| 2013/0325653 A1* | 12/2013 | Ouimet | G06Q 30/06 705/26.7 |
| 2014/0249966 A1* | 9/2014 | Zaragoza | G06Q 30/0635 705/26.81 |
| 2014/0351085 A1* | 11/2014 | Kotas | G06Q 30/0633 705/26.8 |
| 2015/0348108 A1 | 12/2015 | Quinn | |
| 2015/0348168 A1 | 12/2015 | Quinn | |

OTHER PUBLICATIONS

IP.com Prior Art Database Technical Disclosure, "Supply Registry," IP.com, IPCOM000148152D, Mar. 29, 2007. (Year: 2007).*
Office Depot Website: http://www.officedepot.com/a/browse/schoolsupplies/n=5+502600 (captured Aug. 17, 2015); (2 pages).
Target Pilot Test of School List Assist: publicly available on Jul. 24, 2014 (4 pages).
Amazon.com: School Lists, Jun. 27, 2015 (2 pages).
Amazon.com: School Lists—FAQ#teacher, May 27, 2015 (8 pages).

* cited by examiner

FIG. 8

METHOD AND SYSTEM FOR ONLINE SHOPPING FOR SCHOOL SUPPLIES BASED ON GENERIC LISTS PROVIDED BY TEACHERS FOR SEARCHING AND SELECTION BY USERS

BACKGROUND

Online shopping has become a more commonly used technological process by which individuals acquire products and/or services that individuals use and/or need in their daily lives. Brick and mortar retailers have recognized the need to provide online shopping websites that allow their customers to purchase goods over the Internet. It is important to the viability of an online retailer's business that the online shopping experience for customers is easy, informative, quick, productive and ultimately successful. To that end, online retailers have developed online shopping sites that allow customers to purchase goods over the Internet.

For example, in the area of school supplies, one or more retailers have developed one or more web sites that teachers can use to create a web generated teacher school supply list that can be shared with the parents of their students. However, previously developed sites that allow a teacher to create a web generated teacher school supply list place an undue burden on teachers. Specifically, such sites require the teachers to browse a retailer's online web site and select specific products offered by the retailer and upon a teacher's selection of a specific product, the product is added to create a web generated teacher school supply list. This time consuming process is believed to have created a significant obstacle to teachers using retailer sites of this kind to create a web generated teacher school supply list. Further, such web generated teacher school supply lists are tied to a single retailer significantly limiting a parent's purchasing options.

The discussion above is merely provided for general background information and is not intended to be used as an aid in determining the scope of the claimed subject matter. The claimed subject matter is not limited to implementations that solve any or all disadvantages noted in the background.

SUMMARY

Preferred embodiments of the present invention are directed to computer-implemented methods, computer program products and computer systems having one or more features that improve the technological process of online shopping.

One embodiment includes a computer-implemented method for facilitating a customer's online purchase of school supplies listed on one or more generic teacher school supply lists using an online store's website. The computer-implemented method includes one or more of the following steps: generating, using at least one computer having a processor, one or more teacher list locating graphical user interfaces configured to allow a user to locate and select one or more generic teacher school supply lists; receiving user input selecting a first generic teacher school supply list listing one or more items a student of a teacher should have for class; retrieving from one or more non-transitory storage mediums, information corresponding to the first generic teacher school supply list and one or more product identifying information, wherein each product identifying information is indexed against an item on the first generic teacher school supply list and the product identifying information includes information identifying a specific product of an online retailer corresponding to a specific item listed on the first generic teacher school supply list; and, automatically generating an interactive matching items graphical user interface identifying all items of the online retailer matching the first generic teacher school supply list, the interactive matching items graphical user interface includes a first matching items section which includes the following for each matching item: (i) product purchase information; and, (ii) a description of the corresponding item on the first generic teacher school supply list, wherein the product purchase information is displayed adjacent the description of the corresponding item on the first generic teacher school supply list.

Another embodiment includes a non-transitory computer program product having computer executable instructions that when executed by a computer processor perform steps that facilitate a customer's online purchase of school supplies listed on one or more generic teacher school supply lists using an online store's website. The steps include one or more of the following: generating one or more teacher list locating graphical user interfaces configured to allow a user to locate and select one or more generic teacher school supply lists; receiving user input selecting a first generic teacher school supply list listing one or more items a student of a teacher should have for class; retrieving from one or more non-transitory storage mediums information corresponding to the first generic teacher school supply list and one or more product identifying information, wherein each product identifying information is indexed against an item on the first generic teacher school supply list and the product identifying information includes information identifying a specific product of an online retailer corresponding to a specific item listed on the first generic teacher school supply list; automatically generating an interactive matching items graphical user interface identifying all items of the online retailer matching the first generic teacher school supply list, the interactive matching items graphical user interface includes a first matching items section which includes the following for each matching item: (ii) a description of the corresponding item on the first generic teacher school supply list, wherein the description of the corresponding item is identical to the description of the corresponding item on the first generic teacher school supply list; and, (ii) product purchase information; and, displaying on an electronic display of a user's electronic device, an interactive order delivery method selection graphical user interface, the interactive order delivery method selection graphical user interface including a first interactive order delivery icon corresponding to an order to be picked-up in a store and a second interactive order delivery icon corresponding to an order to be shipped to a location specified by the user, the interactive order delivery method selection graphical user interface being displayed after receiving user input selecting the first generic teacher school supply list and before displaying to the user the interactive matching items graphical user interface corresponding to the first generic teacher school supply list.

A further embodiment includes a computer system for facilitating a customer's online purchase of school supplies listed on one or more generic teacher school supply lists using an online store's website. The computer system includes at least one computer having a processor, one or more non-transitory storage mediums and a computer program product. The computer program product includes one or more computer executable instructions that when executed by the processor cause one or more of the following steps to be performed: generating one or more teacher list locating graphical user interfaces configured to allow a user to locate and select one or more generic teacher school supply lists; receiving user input selecting a first generic teacher school supply list listing one or more items a student of a teacher should have for class; retrieving from the one or more non-transitory storage mediums, information corresponding to the first generic teacher school supply list and one or more product identifying information, wherein each product identifying information is indexed against an item on the first generic teacher school supply list and the product identifying information includes information identifying a specific product of an online retailer corresponding to a specific item listed on the first generic teacher school supply list; and, automatically generating an interactive matching items graphical user interface identifying all items of the online retailer matching the first generic teacher school supply list, the interactive matching items graphical user interface includes an interactive add item control, the interactive add item control being configured such that when activated by the user all matching items are automatically added to a user's shopping cart.

This Summary is provided to introduce a selection of concepts in a simplified form that are further described below in the Detailed Description of the Preferred Embodiments of the Invention. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a portion of the preferred graphical user interface depicted in FIG. 7 where a user has scrolled down the class list section and the web page.

Figure 1:
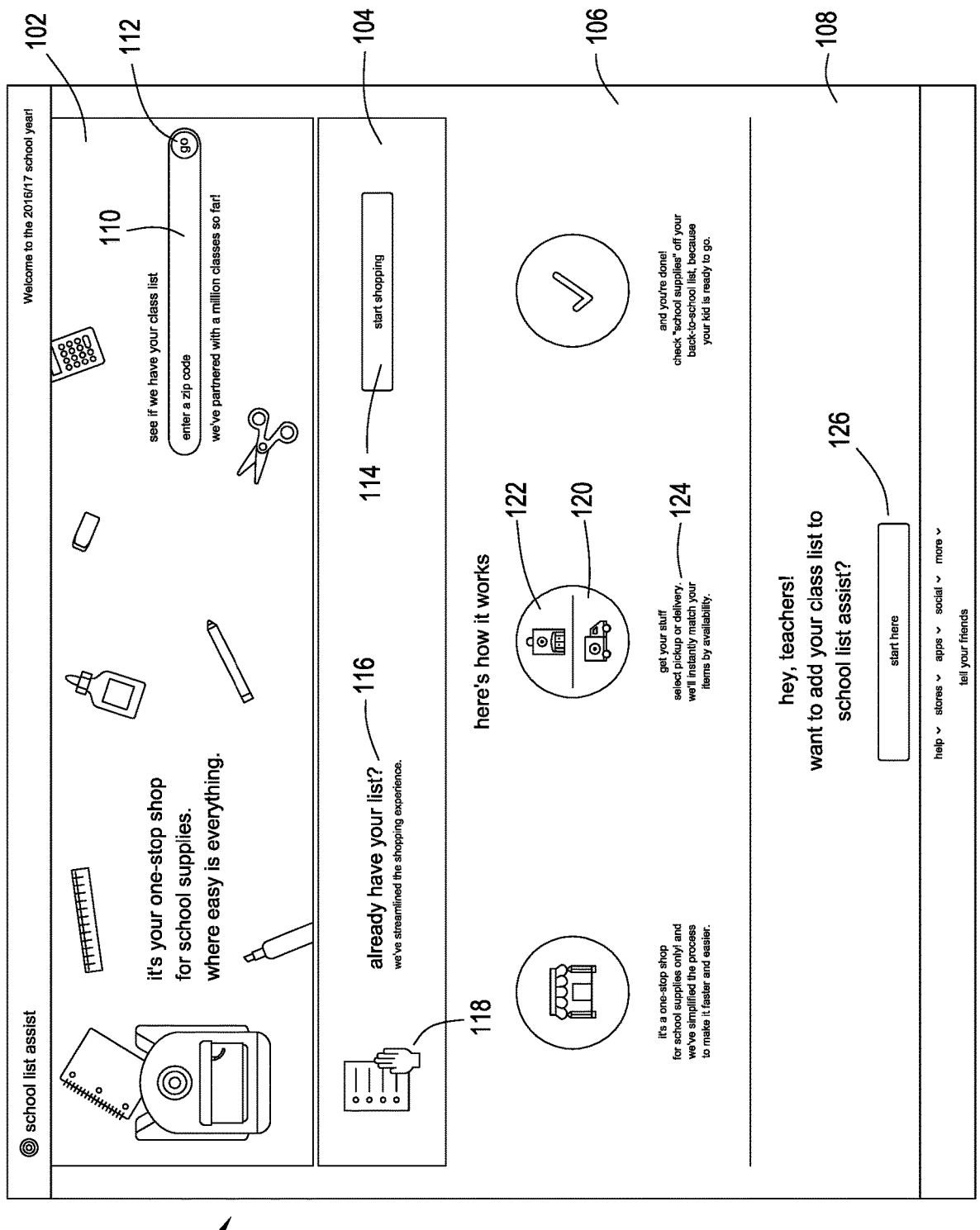
FIG. 1 is a preferred graphical user interface allowing a user to enter a zip code to locate a particular teacher's generic teacher school supply list and allowing a teacher or a person acting on behalf of a teacher to access a third party site to upload one or more generic teacher school supply lists.

DETAILED DESCRIPTION OF THE
PREFERRED EMBODIMENTS OF THE
INVENTION

The preferred forms of the presented invention will now be described with reference to FIGS. 1-10. The appended claims are not limited to the preferred forms and no term and/or phrase used herein is to be given a meaning other than its ordinary meaning unless it is expressly stated otherwise. The use of like reference numerals indicate the same component and/or feature except when otherwise indicated.

A generic teacher school supply list is a list that is originally created by a teacher or by a person or persons acting on behalf of a teacher (hereinafter "teacher designee") listing one or more school supplies that one or more students of the teacher need or should have for class. A generic teacher school list does not include a list originally created by a teacher or teacher designee using an online store website where the teacher or teacher designee selects one or more specific items from the online store website that upon selection are added to a list created by the online store website (hereinafter "web created teacher school list") listing one or more items available for purchase from the online store.

FIG. 1 is a preferred introductory retailer web page 100 for the school list assist feature of a retailer's website that allows a user to locate, select and purchase items from one or more generic teacher school supply lists. The introductory retailer web page may be presented in a GUI (graphical user interface) in the display of any suitable electronic device of a user. A user can access the introductory retailer web page 100 for the school list assist feature depicted in FIG. 1 or other web pages of the school list assist feature from a retailer's home page or a page other than the retailer's home page. For example, a retailer's home page could include a menu bar having an interactive category selection portion that when activated by the user presents the user with a number of selectable product categories including "School and Office Supplies." Upon selection of the "School and Office Supplies" category, the user could be presented with another web page of the retailer having a link to the school list assist feature of the retailer's website. The menu bar having the selectable categories portion could be on web pages of the retailer other than a retailer's home page including but not limited to search results web pages and a user could access the School List Assist feature in a similar manner by selecting the "School and Office Supplies" category. Alternatively, the school list assist feature could be accessible directly from a link on the retailer's home page. The school list assist feature could also be accessible by entering a textual description of the school list assist feature in a search box appearing on the retailer's home page or a search box appearing on any other retailer web page including but not limited to a search results web page or a web page generated as a result of a selection of a category from the interactive category selection portion of any web page of a retailer. The search box could have a type-ahead feature where upon partial entry of the textual description of the school list assist feature, the school list assist feature could appear in a drop-down window or other display element extending downwardly from the search box or presented to the user on any other portion of the web page having the search box. Upon selection of school list assist feature, the user could be directed to an introductory web page of the type illustrated in FIG. 1 or another web page in the school list assist series of web pages. The introductory retailer web page 100 for the school list assist feature can also be accessed by a user activating a link or other navigation control appearing on other web pages in the school list assist series of web pages.

The introductory retailer web page 100 may take many different forms other than the form illustrated in FIG. 1. In the preferred form illustrated in FIG. 1, the retailer web page 100 includes regions 102, 104, 106 and 108. Region 102 includes a zip code search box 110 and a search activation portion or icon 112. The zip code search box 110 preferably includes a message (e.g., "enter zip code") informing the user to enter the zip code of the school corresponding to the one or more generic teacher school supply lists the user is seeking to locate. It should be noted that means other than zip code search box 110 may be provided to allow a user to locate one or more generic teacher school supply lists. For example, one or more search boxes could be provided allowing the user to search by city and/or school name. Region 102 may but need not include graphical representations of various school supplies. Region 104 includes an interactive start shopping portion or icon 114 that can be activated by a user already having selected a generic school supply list. For example, if a user has previously selected the class list "All $2^{nd}$ Grade, OZONE PARK, N.Y.", activation of portion 114 causes the web page illustrated in FIG. 7 to be automatically displayed to the user. Region 104 may but need not include message 116 and a graphical representation 118 informing the user when the user should activate portion 114, i.e., when the user has previously selected a generic teacher school supply list that the user wants to access to purchase or view items on the previously selected generic teacher school supply list. Region 106 includes graphics and text briefly explaining how the school list assist feature works and some of the benefits of this feature. For example, truck graphical representation 120 and store graphical representation 122 inform the user that two delivery methods are available for products purchased using the school list assist feature. The textual description 124 explains to the user that upon selection of the delivery method, the system will automatically match products of retailer with the items on the selected generic teacher school supply list based on availability of product for the selected delivery method. Region 108 includes an interactive portion 126 that a teacher or a person acting on behalf of a teacher can select to upload in any format a generic teacher school supply list to a third party website where the third party is an entity other than the retailer having the school list assist feature. For example, portion 126 when activated could direct a user to Teacherslist.com where the user can register a school and upload one or more generic teacher school supply lists. Alternatively, one or more intermediate pages of the retailer may be provided to the user explaining the benefits of registering. The intermediate page or pages may have a link to the third party web page.

Figure 2:
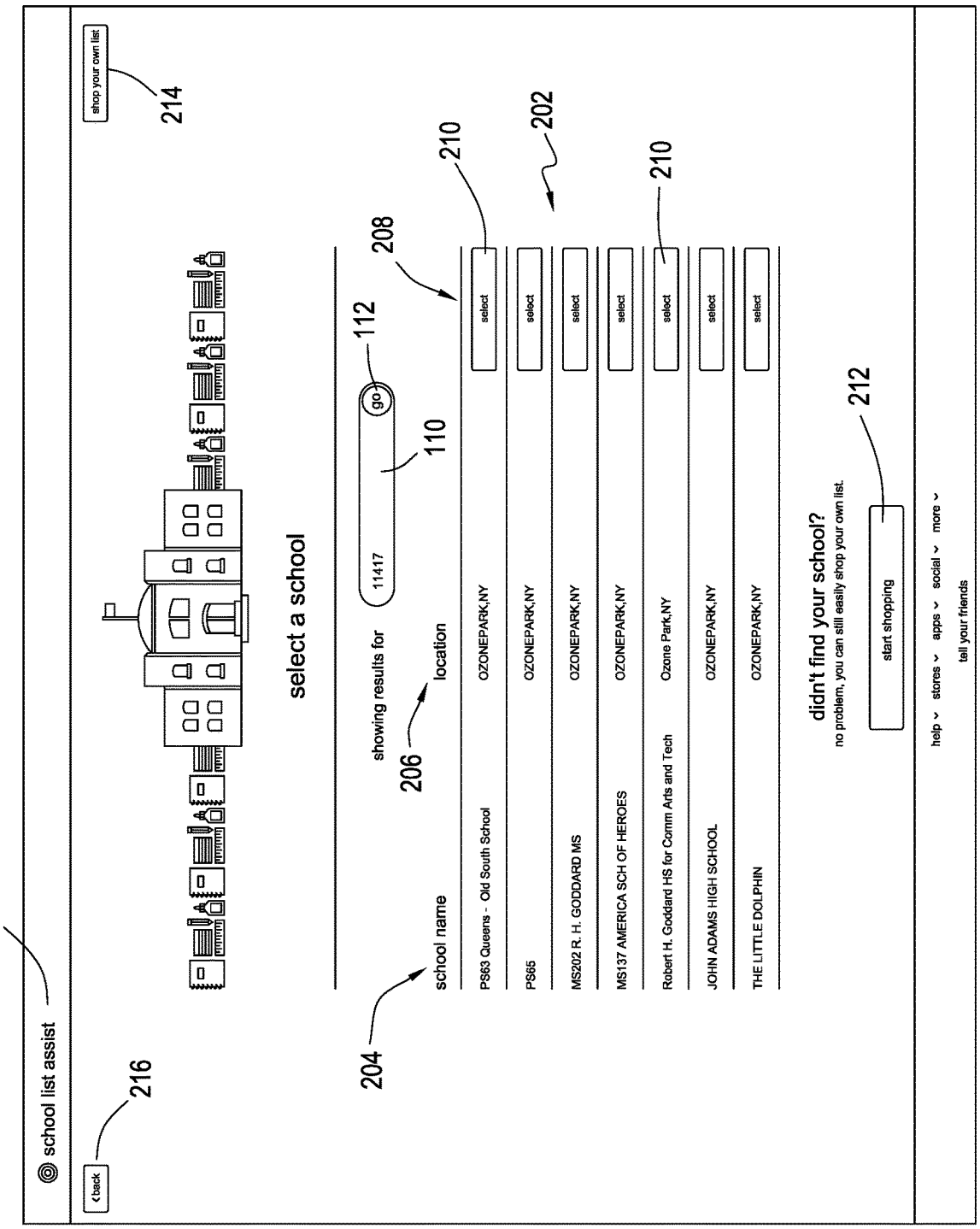
FIG. 2 is a preferred graphical user interface generated subsequent to a user entering a specific zip code, the graphical user interface identifying a plurality of schools within the zip code entered by the user using the graphical user interface in FIG. 1.

FIG. 2 is a "select a school" web page 200 that may take many different forms other than the form illustrated in FIG. 2. The "select a school" web page 200 is automatically generated as a result of an individual entering zip code 11417 into search box 110 and activating the "go" portion 112. The "select a school" web page 200 includes a section 202 identifying all or one or more schools within the selected zip code of 11417. Section 202 includes three vertical columns 204, 206 and 208. Column 204 identifies the school names, column 206 identifies the location of the corresponding school and column 208 includes an interactive portion 210 for each of the listed schools that a user can activate to select a specific school identified in column 204. The "select a school" web page 200 includes an interactive portion 212 that allows a user that could not find their school to begin shopping for school supplies. Upon activation of any of portions 210, the user may be presented with a web page similar to that illustrated in FIG. 3 requesting the user to select a particular class list. Web page 200 may also include an interactive portion 214 in the upper portion of the web page which acts in a similar manner to portion 212. Accordingly, should the listing of schools be so long that portion 212 is not visible on the user's display, then the user can readily access portion 214 to achieve the same results when activating portion 212. The "select a school" web page 200 further includes zip code search box 110 and "go" portion 112. Should the user enter the wrong zip code when viewing web page 100 or the user desires to enter another zip code, the user can readily do so when viewing web page 200 using zip code search box 110 without returning to web page 100. Web page 200 may further include back button or icon 216 which when activated returns the user to the previously viewed page. Web page 200 may further include back button or icon 218 which when activated returns the user to web page 100 regardless of whether web page 100 was the web page previously viewed immediately prior to web page 200.

Figure 3:
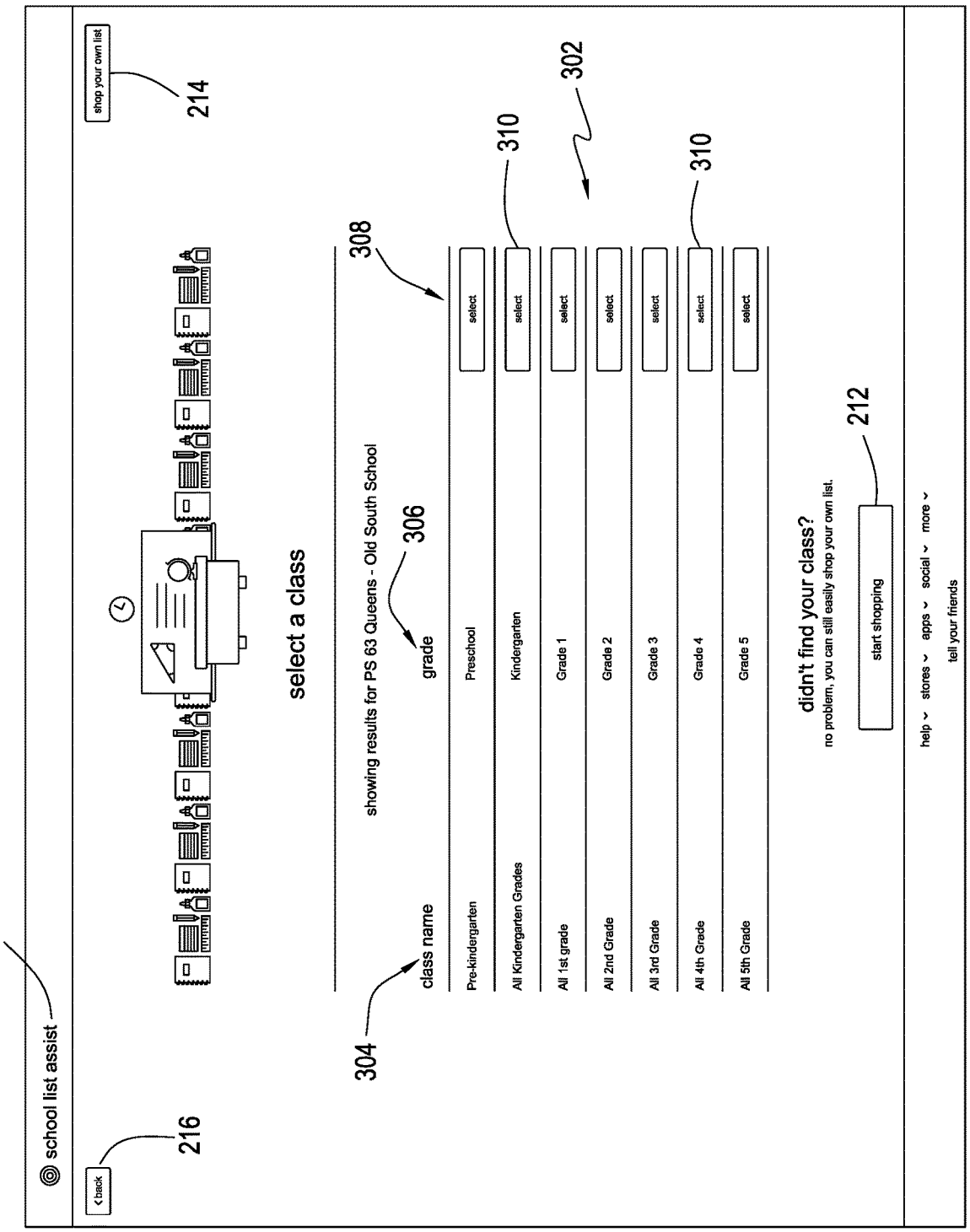
FIG. 3 is a preferred graphical user interface generated subsequent to a user selecting a school from the graphical user interface in FIG. 2, the graphical user interface identifies a plurality of generic teacher school supply lists.

FIG. 3 is a "select a class" web page 300 that may take many different forms other than the form illustrated in FIG. 3. The "select a class" web page 300 is generated as a result of an individual selecting portion 210 corresponding to "PS 63 Queens—Old South School" on web page 200. The "select a class" web page 300 includes a section 302 identifying all or one or more class names within the selected school. The class names could identify specific teachers individually or individual grades or a combination thereof. Section 302 includes three vertical columns 304, 306 and 308. Column 304 identifies the class names, column 306 identifies the grade and column 308 includes an interactive portion 310 for each of the listed class names that a user can activate to select a class identified in column 304. The "select a class" web page 300 includes interactive portions 212, 214, 216 and 218 which function as previously described.

Figure 4:
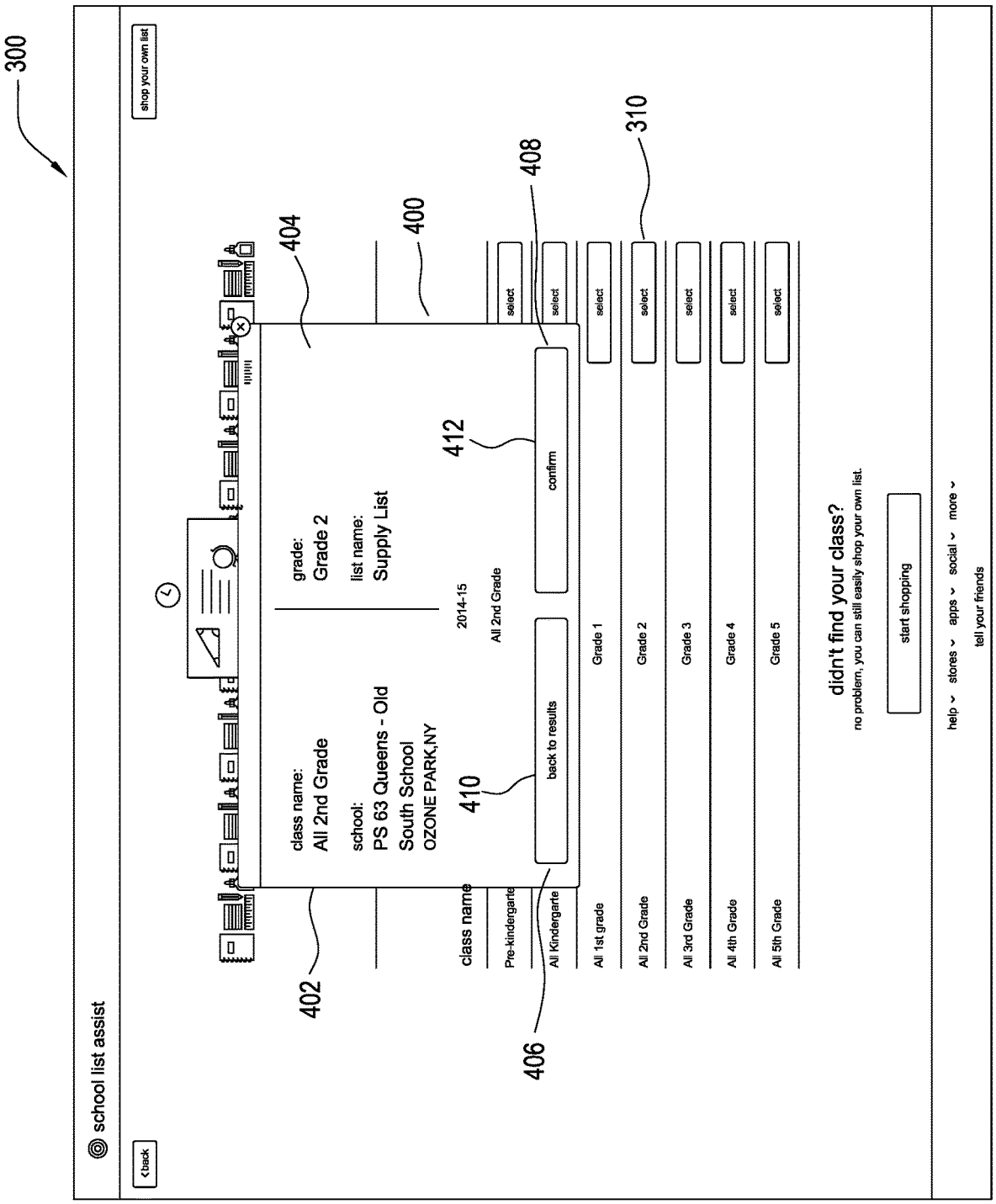
FIG. 4 is a preferred graphical user interface generated subsequent to a user selecting one of the plurality of generic teacher school supply lists using FIG. 3.

FIG. 4 illustrates web page 300 after a user has selected the class name "All $2^{nd}$ Grade" using portion 310 corresponding to the class name "All 2nd Grade". Upon activation of any of portions 310 of web page 300, a user is presented with a dialog box or a pop-up window 400 when a class list exists. If no class list exists for the selected class, a message is provided to the user informing the user that no class list exists. Window 400 includes upper sections 402 and 404 and lower sections 406 and 408. Upper section 402 identifies the class name and school for the class selected by the user. Upper section 404 identifies the grade and class list name for the class list selected by the user. Lower section 406 includes interactive portion 410 that when activated by a user merely closes window 400. Lower section 408 includes interactive portion 412 that when activated by a user automatically directs the user to web page 500 illustrated in FIG. 5. Window 400 may also include a class note or comment provided by the teacher or teacher designee when creating the generic teacher school supply list. The note or comment could be as simple as the school year (e.g., "2014-2015" appearing in window 400 as shown in FIG. 4) or any other desired comment or notation.

Figure 5:
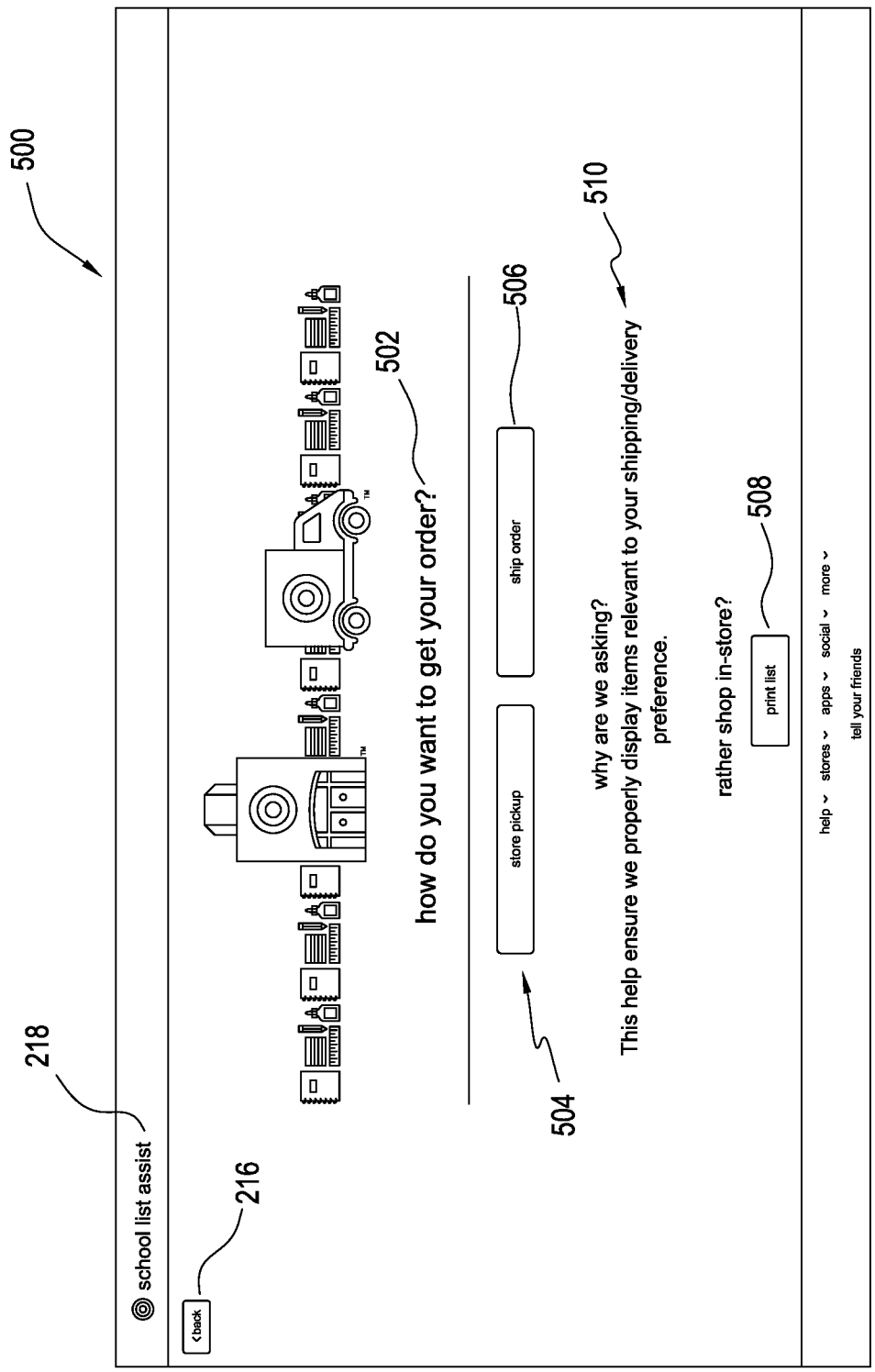
FIG. 5 is a preferred graphical user interface generated subsequent to a user activating the confirm control using FIG. 4.

FIG. 5 illustrates a delivery method selection web page 500 that may take many different forms other than the form illustrated in FIG. 5. A message 502 (e.g., "how do you want to get your order?") is provided to the user requesting the user to select either store pickup or shipping as the method of delivering of the items to be purchased by the user.

Figure 6:
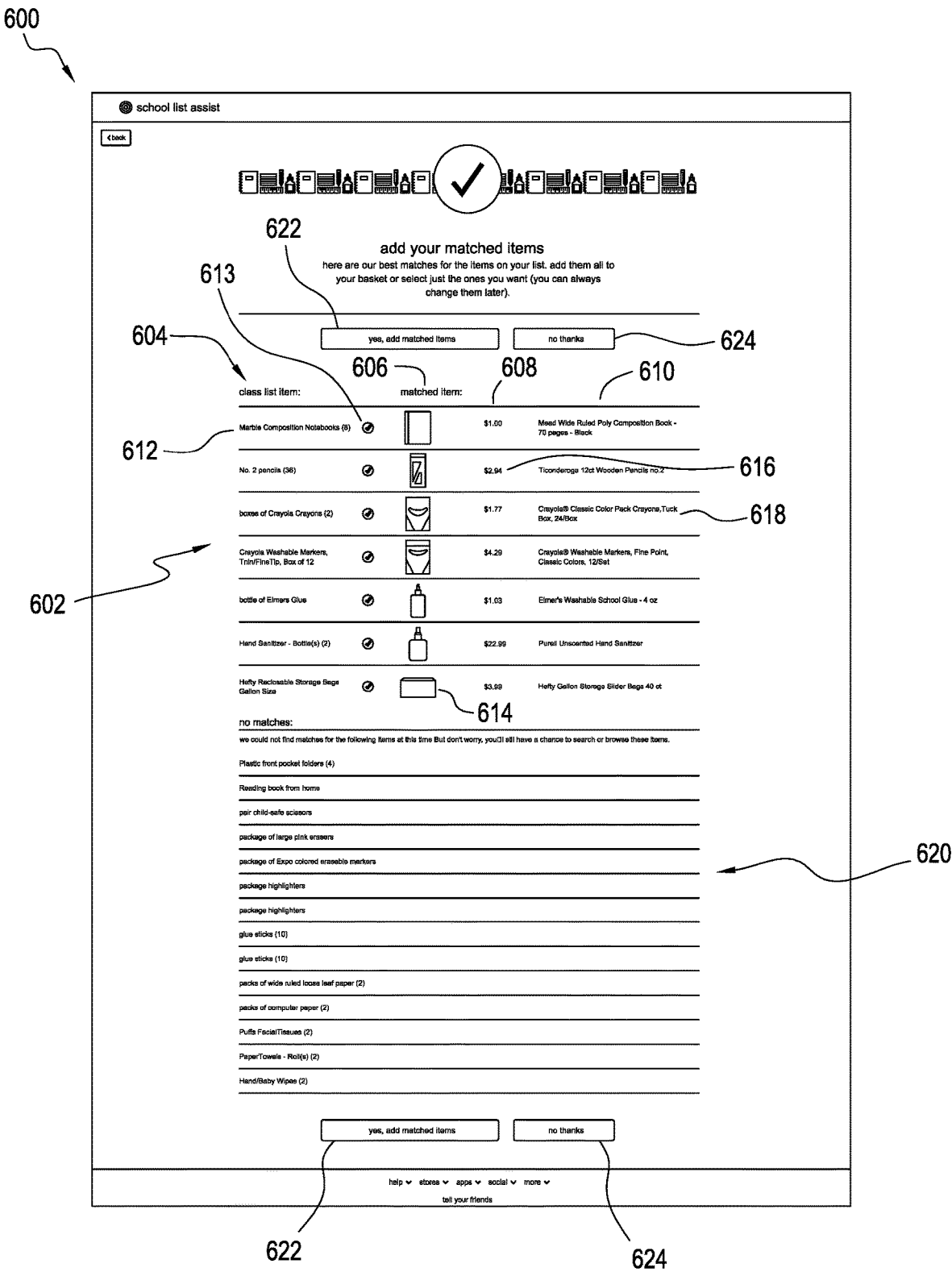
FIG. 6 is a preferred graphical user interface generated subsequent to a user selecting a delivery method using FIG. 5.

Delivery method selection web page 500 includes interactive portions 504, 506 and 508. Interactive portion 504 is selected by a user to pick up his or her order in a specific brick and mortar store. Upon selection of portion 504 by, for example, clicking on or hovering over portion 504, the user is presented with one or more store finder web pages which a user can interact with to specify a specific brick and mortar store. For example, the user may be presented with a store finder web page having a zip code entry search box and upon entry of the desired zip code by the user and activation of the "go" button or icon, the user is presented on the same web page or another web page a list of stores that the user can select from to pick-up the user's order. If the user's zip code is known, the user can be presented with a listing of stores within the known zip code along with the zip code search box so that the user can enter another zip code if desired. After the individual has selected a specific brick and mortar store, web page 600 illustrated in FIG. 6 is automatically generated and displayed to the user. Upon selection of portion 506 by, for example, clicking on or hovering over portion 506, web page 600 illustrated in FIG. 6 is automatically generated and displayed to the user. Upon selection of portion 508 by, for example, clicking on or hovering over portion 508, the generic teacher school supply list is printed for the user's subsequent use. Web page 500 may include a section 510 explaining to the user why the retailer is requesting the user to identify a delivery method.

Figure 9:
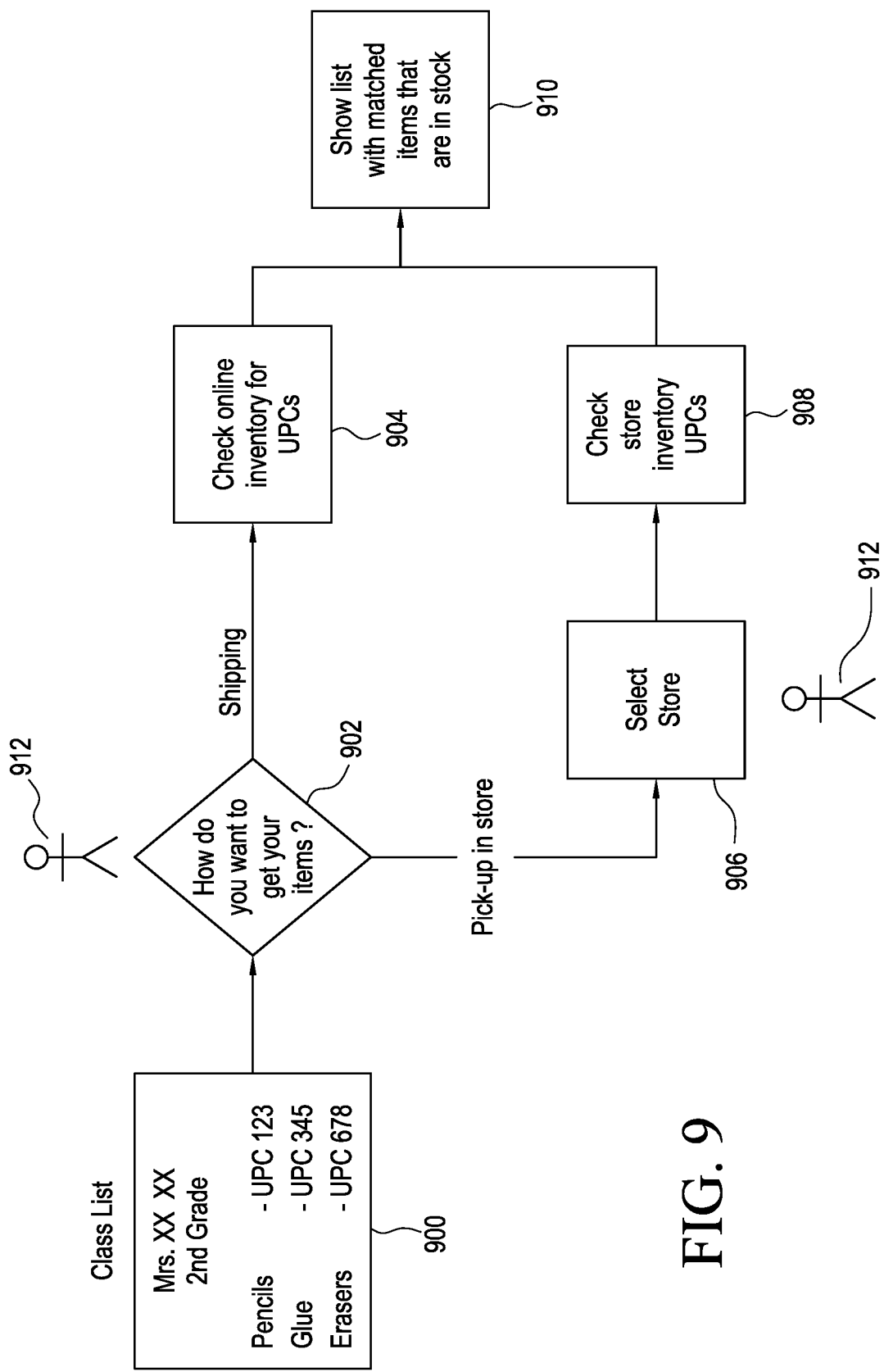
FIG. 9 is a flow diagram of a preferred form of an inventory verification process.

Referring to FIG. 9, a preferred inventory verification process is described which is designed to ensure that all products identified to the user as matching items on a generic teacher school supply list will be or are available for the specific delivery method chosen by the user. In step 900, the user 912 selects a generic teacher school supply list using, for example, web pages 100, 200 and 300. In step 902, user 912 selects either shipping or in store pick-up as the delivery method using, for example, web page 500. If shipping is selected as the delivery method, in step 904 the online inventory of the retailer is automatically checked preferably using UPC codes indexed against the items on the selected generic teacher school supply list to make sure that all products identified as matching are or will be in the retailer's online inventory at a predetermined time period prior to the time the online order is to be shipped. In step 910, the user 912 in presented with a web page (e.g., web page 600) identifying all matching items that have been determined to be in stock at the predetermined time period prior to the time the online order is to be shipped. If store pick-up is selected as the delivery method, in step 906 the user selects a particular store using one or more store finder web pages of the retailer. Once the particular store is selected, at step 908 the inventory for the specified store is automatically checked preferably using UPC codes indexed against the items on the selected generic teacher school supply list to make sure that all products identified as matching are or will be in the inventory of the specified retailer's store at a predetermined time period prior to the time the order is to be picked-up. In step 910, the user in presented with a web page (e.g., web page 600) identifying all matching items that have been determined to be in stock at the predetermined time period prior to the time the order is to be picked-up at the specified store.

FIG. 6 illustrates an example of a matching items web page 600 that is automatically generated at step 910. The matching items web page 600 may take many different forms other than the form illustrated in FIG. 6. Web page 600 includes a matching items section 602 that lists all of the retailer products that match items on the generic teacher school supply list selected by the user. In accordance with a preferred embodiment, only items verified to be in stock using the process illustrated and described in connection with FIG. 9 are displayed in section 602. Section 602 preferably includes vertical columns 604, 606, 608 and 610. Column 604 includes a description 612 of the item or items listed on the generic teacher school supply list for which a match was found. At the end of each description 612 graphical representations 613 (e.g., a highlighted checkmark) may be presented to readily inform the user that this is an item for which a match has been found. Preferably, descriptions 612 are identical or substantially identical to the corresponding descriptions of items appearing on the generic teacher school supply list so that a user can readily verify that the class list items are in fact items on the teacher's list the user is seeking to purchase products for themselves or another individual (e.g., user's child). For example, the user may have a hard copy of the teacher's school supply list which the user compares to descriptions 612 to ensure that the descriptions 612 are items that have in fact been specified by the teacher of interest. However, descriptions 612 may be a more generalized description of the corresponding descriptions of items appearing on the generic teacher school supply list. Column 606 includes graphical representations 614 of the corresponding products of the retailer that have been determined to be matching products. Column 608 includes the corresponding prices 616 of the products of the matching items. Column 610 includes the retailer's descriptions 618 of the corresponding matching products. Matching items web page 600 further includes a no matching items section 620 listing any and all items on the selected generic teacher school supply list for which no matching product was found. This section will include items on the selected generic teacher school supply list that the retailer typically sells but for whatever reason will not be available for inclusion in the user's order due to the delivery method selected by the user. For example, if the user selected a specific brick and mortar store to pick-up the user's order and a matching item typically sold by the retailer and in fact is available in the retailer's online inventory will not be in stock at the specified store at the necessary time, the item will be listed as having no matching item under section 620. Matching items web page 600 further includes interactive portions 622 and 624 in the upper and lower regions of web page 600. Either the upper or lower portion 622 may be selected or activated by a user to automatically have all matching items in section 604 added to the user's shopping cart or basket. Upon activation of either portion 622, web page 700 is automatically generated and displayed to the user. Upon activation of either portion 624, a web page similar to web page 700 is automatically generated and displayed to the user. In the case of activation of portion 624, the web page generated and displayed could be identical to web page 700 except for the fact that the "your basket" section would not include any of the matching items identified on the matching items page on which the user activated portion 624. However, it should be noted that the "your basket" section may include matching items for another teacher list previously selected by the user. For example, during an online shopping session, a user may have activated portion 622 on a matching items web page corresponding to class X. In the same shopping session, the user may have activated portion 624 on a matching items web page corresponding to class Y. A web page similar to web page 700 would be automatically generated and displayed to the user having matching items for class X displayed in the "your basket" section but not for class Y.

Figure 7:
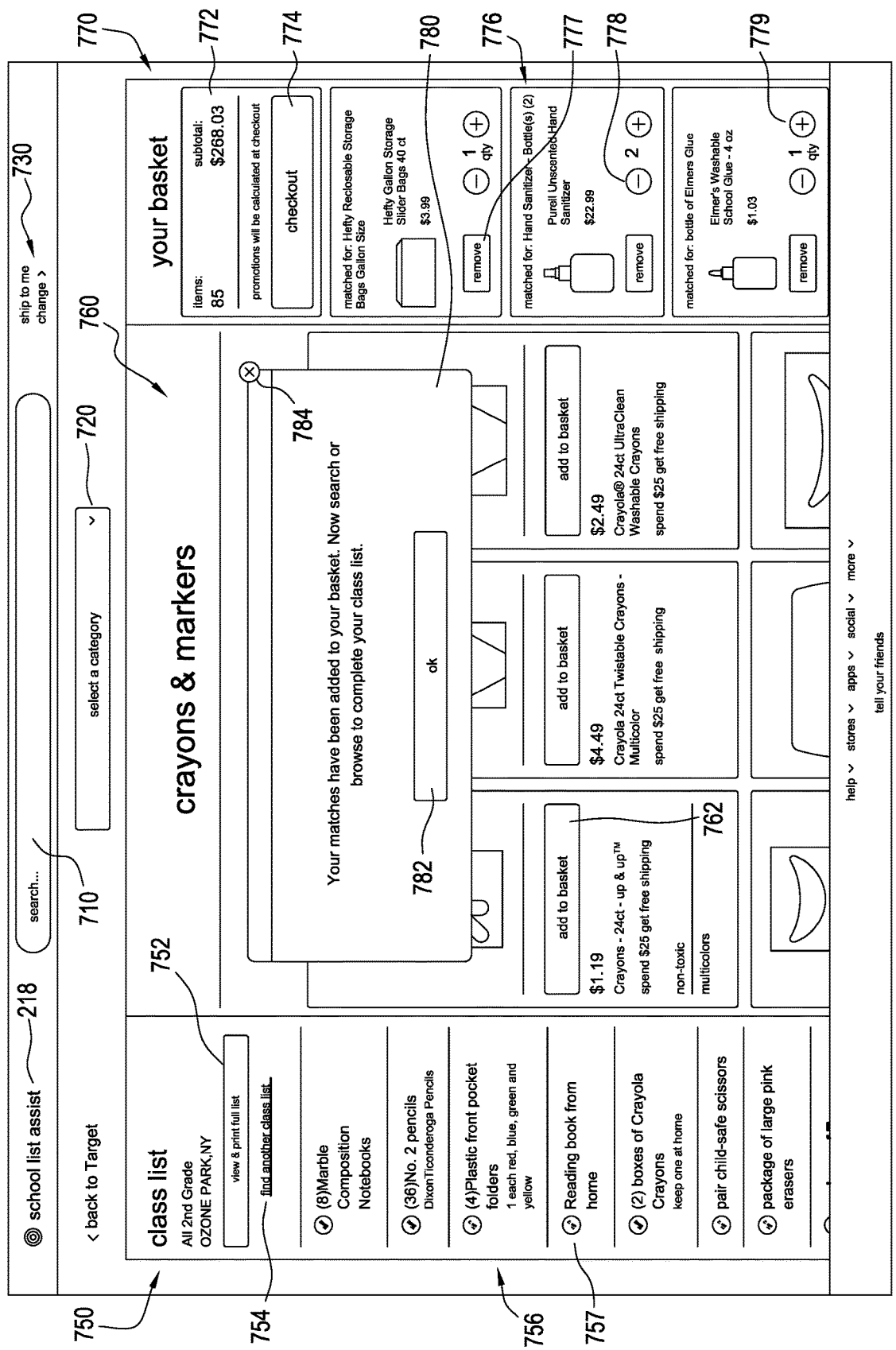
FIG. 7 is a preferred graphical user interface generated subsequent to a user selecting the adding matching items interactive control using FIG. 6.
Figure 8:
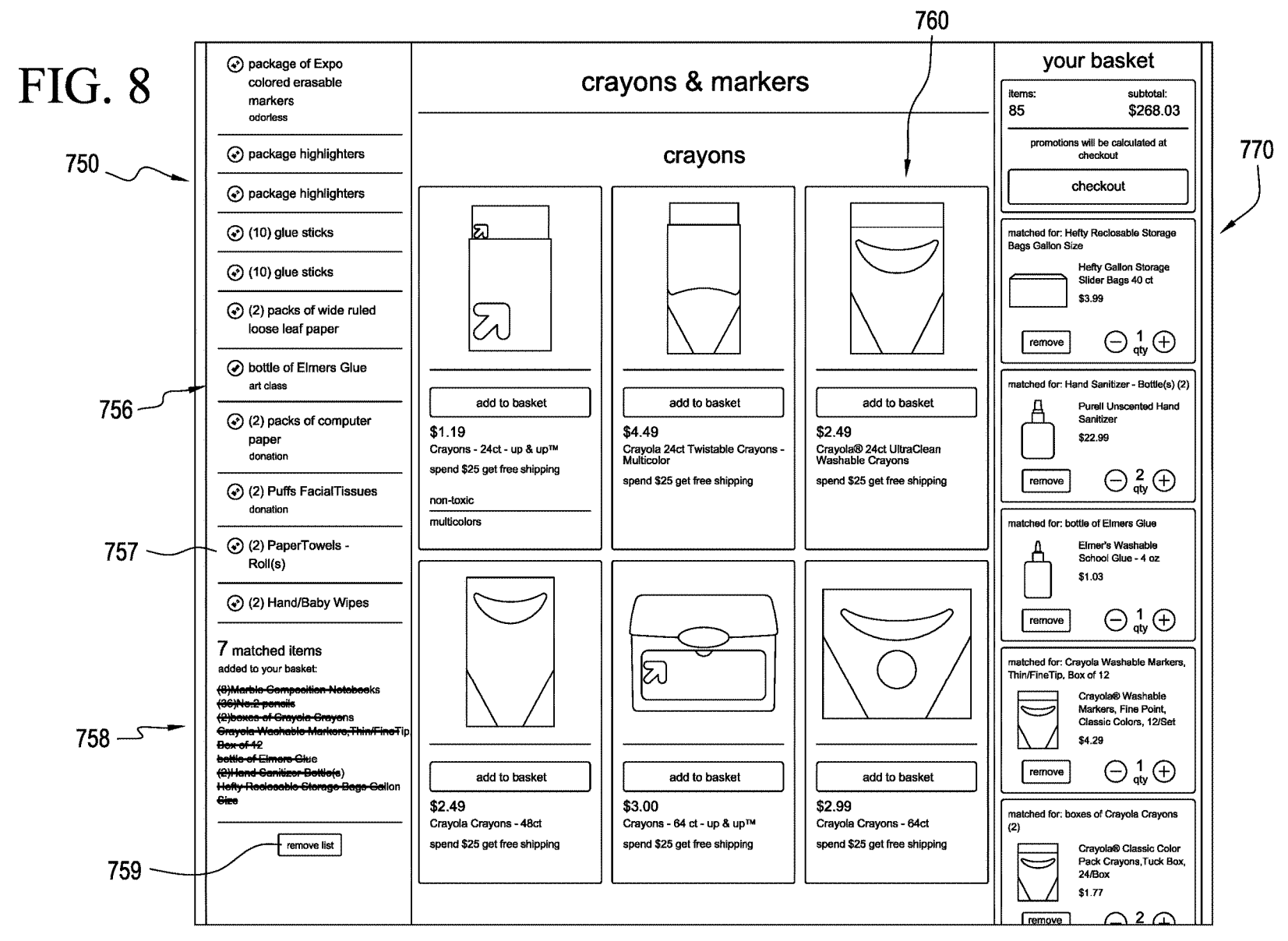

FIGS. 7 and 8 illustrate an example of a search and purchase web page 700 that is automatically generated and displayed under the conditions previously described. FIG. 8 shows a portion of web page 700 after a user has scrolled down on the "class list" section and scrolled slightly down on the web page 700 such that the upper portion of web page 700 is no longer visible on the user's display. Web page 700 includes a search box 710 that allows a user to search for products in the school supply department of the retailer. Search box 710 could employ type-ahead technology where upon partial entry of a school supply term (e.g., "pe" for "pencil) a drop-down window or list could be provided identifying matching items and for each matching item in the drop-down window and add to basket or cart icon or button could be displayed which when activated by the user automatically adds the corresponding item to the user's basket. Should the user enter a search term that corresponds to a product outside of the school supply department of the retailer, a link could be automatically provided on web page 700 directing the user to a retailer's home page or other page where items outside of the school supply department can be searched for and purchased. Web page 700 further includes "select a category" drop down menu 720 that when activated by the user presents categories within the school supply department of the retailer. Web page 700 may include a "ship to me change" link, icon or button 730 which when activated by the user causes web page 500 to be automatically generated and displayed allowing the user to change the method of delivery. Web page 700 may include a "back to Target" link, icon or button 740 which when activated by the user directs the user back to one or more general web pages of a retailer allowing the user to search for and purchase items outside of the school supply department.

Web page 700 further includes left side region 750, middle region 760 and right side region 770. Each of regions 750, 760 and 770 are preferably vertically scrollable. A scroll bar dedicated for each region may be provided in addition to a scroll bar for scrolling the entire web page 700. Section 750 includes a view and print interactive portion 752 allowing a user to view and print the selected class list. Section 750 also includes a "find another class list" interactive portion 754 that when activated by the user causes web page 200 to be automatically generated and displayed. Section 750 may further include region 756 identifying items on the generic teacher school supply list with a graphical representation 757 indicating whether a matched product was found for the item on the selected list. For example, a highlighted check mark appearing in a circle could designate an item for which a match has been found and a phantom check mark appearing in a circle could designate an item for which no match was found. Region 756 may further include any note or comment created by the teacher or teacher designee for any item on the generic teacher school supply list. The comment or note "1 each red, blue, green, and yellow" appearing in FIG. 7 is one example of a note or comment that could be created by a teacher or teacher designee for the generic item "(4) Plastic front pocket folders" appearing on the example generic teacher school supply list corresponding to FIG. 7. Section 750 may further include section 758 (see FIG. 8) which identifies the number of matched items and a description of the matched items with a strike through or other graphical representation identifying that the user no longer needs to acquire the item on the selected list. Section 750 may further include "remove list" interactive portion 759 (see FIG. 8) which when activated by the user, removes portion 720 as well as the contents of section 750 specific to the selected list and populates section 750 with all of the categories in the school supply department previously accessed through portion 720.

Section 760 is automatically populated with items of a specific category upon selection of a specific category by a user using interactive category selection portion 720 or by activating one of the categories in section 750 when the "remove list" interactive portion 759 has been activated. If no category has been selected, items in a default category (e.g., "crayons & markers") are displayed in section 760. An add to basket button or icon 762 is associated with each item displayed in section 760 which a user can activate to add a corresponding item to the user's shopping cart or basket displayed in section 770. Product purchase information may also be provided for each item displayed in section 760 including but not limited to a product price, a product description (e.g., text and/or graphic), a product characteristic (e.g., "non-toxic") and one or more special offers (e.g., "spend $25 get free shipping"). Upon initial display of web page 700, a dialog box 780 may be displayed informing the user that all matching items have been added to the users shopping cart or basket. The dialog box 780 is removed upon activation of the "ok" portion 782 or the close icon 784.

Upon initial presentation of web page 700, section 770 is automatically populated with all products determined to match items on the selected list. Section 770 includes summary section 772 which identifies the number of items and subtotal of the items currently in a user's shopping cart. The number of items and subtotal are automatically adjusted as items are removed from and added to the shopping cart. Section 770 further includes a checkout control 774 that a user can activate to purchase items in the shopping cart. Section 770 further includes a lower region having an interactive portion 776 for each product in the shopping cart. Each portion 776 may include remove interactive portion 777, a subtract interactive portion 778 and an add interactive portion 779. Portion 777 when activated removes the corresponding product from the shopping cart. Portion 779 when activated increases the quantity of the corresponding product by one and portion 778 when activated decreases the quantity of the corresponding product by one. Each portion 776 may further include a description of the item as it appears on the selected list or a more generalized description of the item appearing on the selected list, a product image, a product price and a retailer product description.

Figure 10:
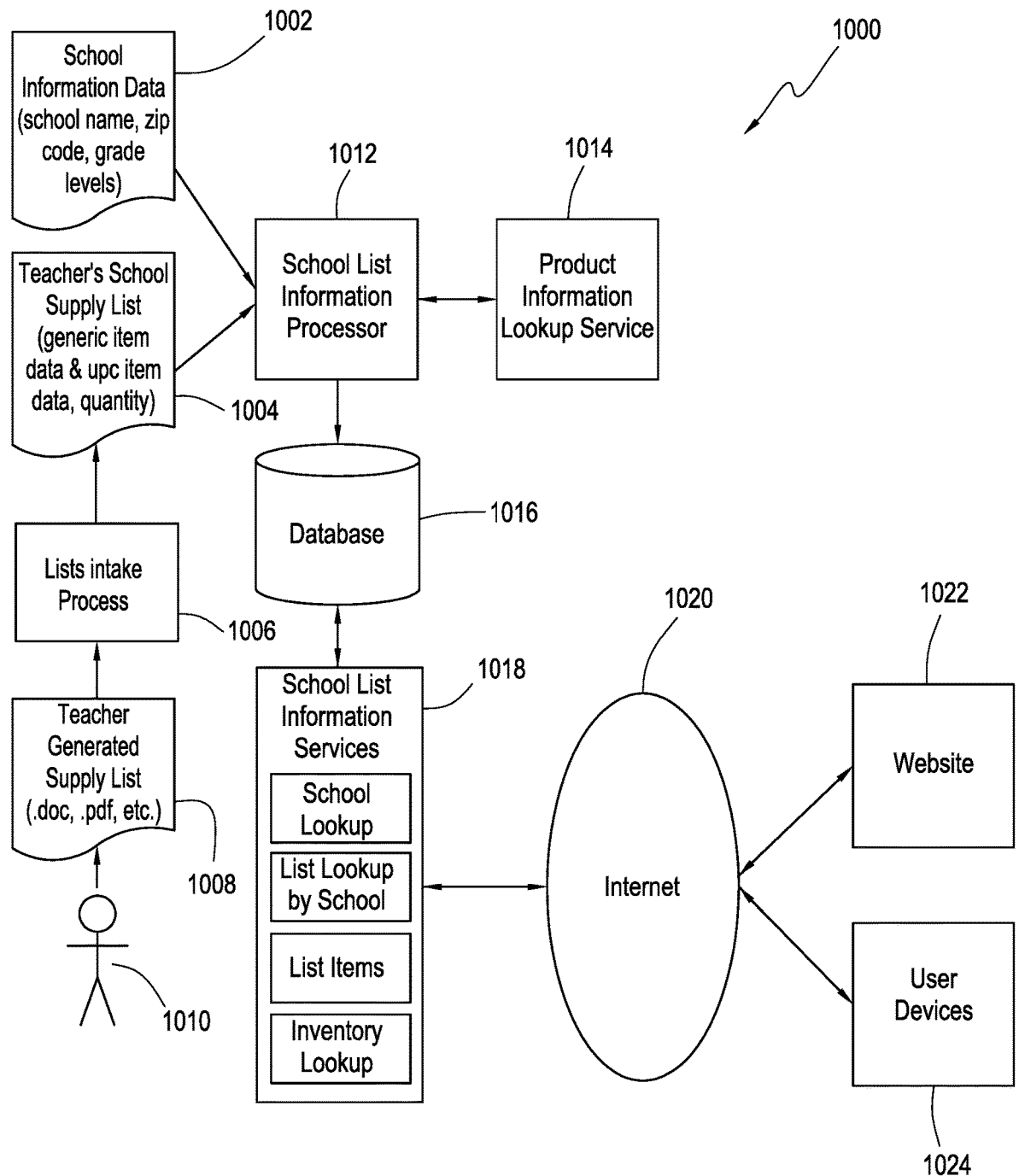
FIG. 10 is a schematic diagram of a preferred computer system.

FIG. 10 illustrates one of many possible computer system configurations 1000 for implementing the preferred forms of the present invention. At 1002, computer system 1000 receives information on schools within the desired geographical region. The geographical region can include the entire geographical region serviced by the retailer or a subset of the entire geographical region serviced by the retailer. The school information may include school name, school zip code and grade levels. The information received at 1002 may be generated by the retailer or a third party (e.g., an entity other than the retailer). At 1004, computer system 1000 receives information on one or more generic teacher school supply lists for each of the schools where information is received at 1002. The generic teacher school supply list information preferably includes a description identical or substantially identical to the description appearing on a generic teacher school supply list or a more generalized description of items appearing on a generic teacher school supply list. The generic teacher school supply list information further preferably includes UPC codes for items listed on the generic teacher school supply list, i.e., the UPC code for a product corresponding to an item on the generic teacher school supply list is indexed against the corresponding item.

The generic teacher school supply list information preferably includes a quantity for a particular item specified on the generic teacher school supply list. The generic teacher school supply list information may be generated internally by the retailer or may be provided to the retailer by a third party. At 1006 and 1008 a teacher or teacher designee 1010 may use the retailer's website to upload one or more generic teacher school supply lists. As previously described a teacher or teacher designee 1010 may activate portion 126 to upload using a third party's website one or more generic teacher school supply lists in any format including but not limited to any text format or other format (e.g., pdf. format). Computer system 1000 preferably includes processor 1012, product information lookup service 1014, database 1016, school list information services 1018, an Internet connection 1020, the retailer's website 1022 and one or more user devices 1024 accessing the retailer's website over the Internet. Database 1016 may store all information including computer executable instructions to implement the preferred forms of the present invention. It will be readily understood that multiple databases may be used to implement preferred forms of the present invention. Product information lookup services 1014 functions to identify and display on the appropriate web page product information of a retailer (e.g., a product image, product price and product description) corresponding to the UPC codes corresponding to items listed on a selected generic teacher school supply list. The school list information services 1018 include a school lookup that provides and processes the previously described web pages the user interacts with to select a school of interest. The school list information services 1018 also includes a list lookup that provides and processes the user interfaces previously described that a user interacts with to select a particular generic teacher school supply list. The school list information services 1018 further includes a list item component that identifies all items listed on a selected generic teacher school supply list. The school list information services 1018 further includes an inventory lookup which verifies that the product identified as a matching item will be available to fill the user's order depending upon the delivery method selected by the user as previously described in connection with FIG. 9. One or more user devices 1024 can access a retailer website 1022 over the Internet to locate and select a generic teacher school supply list and purchase one or more matching products as well as other products. The user devices 1024 may be any suitable user device including but not limited handheld or other portable devices as well as desktops, laptops and other computing devices. As such, the preferred forms of the present invention significantly improve the technological process of online shopping for items identified on a teacher's school supply list without placing undue burden on the teacher, the teacher designee or the customer. Further, the features described above improve the technological process of online shopping as the above described features make the online shopping experience easy, informative, quick, productive and ultimately successful.

In some examples, the features described are implemented in digital electronic circuitry, or in computer hardware, firmware, software, or in combinations of them. The apparatus is optionally implemented in a non-transitory computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer. Alternatively or in addition to the foregoing, a touch screen activated by a user's finger or stylus could be provided to facilitate a user's interaction with the computer system.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

The forgoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. The claims are not limited to the preferred embodiments and have been written to preclude such a narrow construction using the principles of claim differentiation.

Further, in describing representative embodiments of the present invention, the specification may have presented the preferred method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of steps set forth in the specification should not be construed as limitations on the claims. In addition, the claims directed to the method and/or process of the present invention should not be limited to the performance of their steps in the order presented, and one skilled in the art can readily appreciate that the sequences may be varied and still remain within the spirit and scope of the present invention.

The invention claimed is:

1. A computer program product including one or more non-transitory storage mediums having computer executable instructions that when executed by a processor cause the following steps to be performed:

receiving electronically by the processor, from one or more user devices in possession of one or more teachers or teacher designees, one or more teacher school supply lists inputted by the one or more teachers or teacher designees interacting with at least one list submission graphical user interface, each teacher school supply list having one or more generically described items a student of a teacher is required to have for class, wherein each generically described item is described only by its generic term or terms;

subsequent to the processor receiving electronically the one or more teacher school supply lists, indexing, by the processor, products located by the processor on a retailer data server, said products corresponding to each of the one or more generically described items of the one or more teacher school supply lists and associating by the processor a retailer's corresponding product with each of the one or more generically described items;

storing, by the processor, in a database, each association of a retailer's corresponding product with each of the one or more generically described items;

accessing a first retailer's website by a first customer using a first customer user device during a first shopping session, wherein the first retailer's website is generated by a first retailer server;

performing each of the following steps during the first shopping session conducted by the first customer accessing the first retailer's website by using the first customer user device:

generating the first retailer's website by the first retailer server, and transmitting the website to the first customer user device for presentation to the first customer;

presenting the first retailer's website on the first customer user device to the first customer during the first shopping session of the first customer conducted using the first retailer's website, the presented first retailer's website including one or more teacher list locating graphical user interfaces configured by the first retailer server to allow the first customer to use the teacher list locating graphical user interfaces to locate and select one or more teacher school supply lists;

receiving by the first retailer server, from the first customer user device during the first shopping session of the first customer conducted using the first retailer's website, a first customer's interaction with the one or more teacher list locating graphical user interfaces included in the presentation of the first retailer's website on the first customer user device, the first customer's interaction including the first customer locating and selecting a first teacher school supply list by interacting with the one or more teacher list locating graphical user interfaces presented on the first customer user device, wherein the first teacher school supply list located and selected by the first customer includes one or more generically described items a student of a teacher is required to have for class, wherein each generically described item is described only by its generic term or terms;

retrieving, by the processor, from the database during the first shopping session of the first customer conducted by the first customer through interaction with the first retailer's website as presented on the first customer user device, first retailer product information including first retailer products available for purchase from the first retailer that correspond to each item on the first teacher school supply list;

communicating by the processor to the first customer user device, during the first shopping session of the first customer, the first retailer product information including first retailer products available for purchase from the first retailer that correspond to each item on the first teacher school supply list;

subsequent to the retrieving step, automatically generating by the processor, an interactive matching items graphical user interface identifying all available first retailer products that correspond to items on the first teacher school supply list, the interactive matching items graphical user interface including an interactive add item control that when activated automatically adds all available first retailer products, that correspond to items on the first teacher school supply list, to the first customer's electronic shopping cart;

communicating by the processor to the first customer user device the interactive matching items graphical user interface; and presenting the interactive matching items graphical user interface on the first customer user device to the first customer as an element of the first retailer's website during the first shopping session conducted by the first customer using the first retailer's website, the interactive matching items graphical user interface identifying all available first retailer products that correspond to items on the first teacher school supply list, the interactive matching items graphical user interface including an interactive add item control that when activated by the first customer automatically adds all available first retailer products that correspond to items on the first teacher school supply list to the first customer's electronic shopping cart.

2. The computer program product of claim 1, further having computer executable instructions that when executed by a computer processor perform steps of:

during the first shopping session conducted by the first customer using the first retailer's web site, receiving a first customer's input that the interactive add item control on the interactive matching items graphical user interface has been activated; and, upon receiving the first customer's input, during the first shopping session conducted by the first customer using the first retailer's web site, that the interactive add item control on the interactive matching items graphical user interface has been activated, displaying, during the first shopping session conducted by the first customer using the first retailer's web site, a search and purchase web page of the first retailer having an interactive checkout control and an interactive search section, the interactive checkout control being configured such that when activated by the first customer one or more purchase graphical user interfaces are displayed to the first customer allowing the first customer to purchase one or more products of the first retailer and the interactive search section being configured to allow the first customer to search for one or more items on the first retailer's website during the first shopping session.

3. The computer program product of claim 2, wherein:
the search and purchase web page of the first retailer includes an upper section having a search input box and a category selection control, the search input box being configured to allow the first customer to search for one or more items in a school supply department of the first retailer, during the first shopping session, by entering at least a partial textual description of one or more items and the category selection control being configured such that when activated by the first customer a plurality of user selectable product categories are displayed below the category selection control and upon selection of one of the plurality of user selectable product categories, the search and purchase web page of the first retailer-is populated with a scrollable display section displayed below the category selection control displaying items within a selected product category of the school supply department of the first retailer.

4. The computer program product of claim 3, wherein:
the search and purchase web page of the first retailer includes a scrollable class list section extending downwardly from the upper section, the scrollable class list section including an upper region, a middle region and a lower region, the upper region of the scrollable class list section having a class list view and print control and a search class list control, the class list view and print control being configured to allow the first customer during the first shopping session conducted by the first customer using the first retailer's website to view and print the first teacher school supply list and the search class list control being configured such that when activated by the first customer, during the first shopping session conducted by the first customer using the first retailer's website, the one or more teacher list locating graphical user interfaces are generated to allow a user to locate and select a second teacher school supply list.

5. The computer program product of claim 4, wherein:
the middle region of the scrollable class list section lists all items on the first teacher school supply list for which no match was found and the lower region of the scrollable class list section lists all items on the first teacher school supply list for which a match was found and a graphical representation is provided for each available first retailer product that corresponds to an item on the first teacher school supply list identifying to the first customer, during the first shopping session conducted by the first customer using the first retailer's website, that the available first retailer product that corresponds to an item on the first teacher school supply list has been added to the first customer's electronic shopping cart.

6. The computer program product of claim 5, wherein:
the scrollable class list section includes a bottom region disposed below the lower region, the bottom region includes an interactive remove list control, the interactive remove list control is configured such that when activated by the first customer, during the first shopping session conducted by the first customer using the first retailer's website, the scrollable class list section is removed from the search and purchase web page of the first retailer and the category selection control is removed from the upper section of the search and purchase web page of the first retailer and wherein a selectable category control listing a plurality of selectable product categories in the school supply department of the retailer is displayed in a section of the search and purchase web page of the retailer where the scrollable class list section was previously displayed.

7. The computer program product of claim 6, wherein:
the search and purchase web page of the first retailer includes a scrollable first customer electronic shopping cart section identifying all available first retailer products that correspond to items on the first teacher school supply list currently in the first customer's electronic shopping cart, the scrollable first customer electronic shopping cart section includes an individual item removal control associated with each available first retailer product that corresponds to an item on the first teacher school supply list which when activated by the first customer removes the corresponding available first retailer product that corresponds to an item on the first teacher school supply list from the first customer's electronic shopping cart.

8. A computer system for facilitating a customer's online purchase of school supplies listed on one or more teacher school supply lists using an online store's website, said computer system including:
a first customer user device;
a first retailer server that generates a first retailer's website configured to be presented on the first customer user device to a first customer to enable the first customer to directly purchase products from the first retailer over the Internet while interacting with the first customer user device to search the first retailer's website presented to the first customer on the first customer user device;
at least one processor, one or more non-transitory storage mediums and a computer program product having one or more computer executable instructions that when executed by the processor cause the following steps to be performed:
receiving electronically by the processor, from one or more user devices in possession of one or more teachers or teacher designees, one or more teacher school supply lists inputted by the one or more teachers or teacher designees interacting with at least one list submission graphical user interface, each teacher school supply list having one or more generically described items a student of a teacher is required to have for class, wherein each generically described item is described only by its generic term or terms;

subsequent to the processor receiving electronically the one or more teacher school supply lists, indexing, by the processor, products located by the processor on a retailer data server, said products corresponding to each of the one or more generically described items of the one or more teacher school supply lists and associating by the processor a retailer's corresponding product with each of the one or more generically described items;

storing, by the processor, in a database each association of a retailer's corresponding product with each of the one or more generically described items;

accessing the first retailer's website by the first customer using the first customer user device during a first shopping session, wherein the first retailer's website is generated by the first retailer server;

performing each of the following steps during the first shopping session conducted by the first customer accessing the first retailer's website by using the first customer user device:

generating the first retailer's website by a first retailer server, and transmitting the website to the first customer user device for presentation to the first customer;

presenting the first retailer's website on the first customer user device to the first customer during the first shopping session of the first customer conducted using the first retailer's website, the presented first retailer's website including one or more teacher list locating graphical user interfaces configured by the first retailer server to allow the first customer to use the teacher list locating graphical user interfaces to locate and select one or more teacher school supply lists;

receiving by the first retailer server, from the first customer user device during the first shopping session of the first customer conducted using the first retailer's website, a first customer's interaction with the one or more teacher list locating graphical user interfaces included in the presentation of the first retailer's website on the first customer user device, the first customer's interaction including the first customer locating and selecting a first teacher school supply list by interacting with the one or more teacher list locating graphical user interfaces presented on the first customer user device, wherein the first teacher school supply list located and selected by the first customer includes one or more generically described items a student of a teacher is required to have for class, wherein each generically described item is described only by its generic term or terms;

retrieving, by the processor, from the database during the first shopping session of the first customer conducted by the first customer through interaction with the first retailer's website as presented on the first customer user device, first retailer product information including first retailer products available for purchase from the first retailer that correspond to each item on the first teacher school supply list;

communicating by the processor to the first customer user device, during the first shopping session of the first customer, the first retailer product information including first retailer products available for purchase from the first retailer that correspond to each item on the first teacher school supply list;

subsequent to retrieving, automatically generating by the processor, an interactive matching items graphical user interface identifying all available first retailer products that correspond to items on the first teacher school supply list, the interactive matching items graphical user interface including an interactive add item control that when activated automatically adds all available first retailer products, that correspond to items on the first teacher school supply list, to the first customer's electronic shopping cart;

communicating by the processor to the first customer user device the interactive matching items graphical user interface; and presenting the interactive matching items graphical user interface on the first customer user device to the first customer as an element of the first retailer's website during the first shopping session conducted by the first customer using the first retailer's website, the interactive matching items graphical user interface identifying all available first retailer products that correspond to items on the first teacher school supply list, the interactive matching items graphical user interface including an interactive add item control that when activated by the first customer automatically adds all available first retailer products that correspond to items on the first teacher school supply list to the first customer's electronic shopping cart.

9. The computer system of claim 8, wherein the computer program product further having one or more computer executable instructions that when executed by the processor cause the following step to be performed:

during the first shopping session conducted by the first customer using the first retailer's website, displaying on an electronic display of the first customer user device, an interactive order delivery method selection graphical user interface, the interactive order delivery method selection graphical user interface including a first interactive order delivery method icon corresponding to an order to be picked-up in a store and a second interactive order delivery method icon corresponding to an order to be shipped to a location specified by the first customer, the interactive order delivery method selection graphical user interface being displayed during the first shopping session conducted by the first customer using the first retailer's website and before displaying to the first customer the interactive matching items graphical user interface corresponding to the first teacher school supply list.

10. The computer system of claim 9, wherein the computer program product further having one or more computer executable instructions that when executed by the processor cause the following steps to be performed:

receiving first customer input during the first shopping session conducted by the first customer using the first retailer's web site that the first interactive order delivery method icon has been activated by the first customer;

subsequent to receiving first customer input that the first interactive order delivery method icon has been activated by the first customer and before displaying to the first customer the interactive matching items graphical user interface corresponding to the first teacher school supply list, checking an inventory of a first store; and, subsequent to checking an inventory of the first store, automatically displaying during the first shopping session conducted by the first customer using the first retailer's website, without further first customer input, the interactive matching items graphical user interface wherein a first section of the interactive matching items graphical user interface includes only available first retailer products that correspond to items on the first teacher school supply list that will be in the inventory of the first store at a predetermined time before an order of the first customer is to be picked-up.

11. The computer system of claim 9, wherein the computer program product further having one or more computer executable instructions that when executed by the processor cause the following steps to be performed:
receiving first customer input during the first shopping session conducted by the first customer using the first retailer's web site that the second interactive order delivery method icon has been activated by the first customer;
subsequent to receiving first customer input that the second interactive order delivery method icon has been activated by the first customer and before displaying to the first customer the interactive matching items graphical user interface corresponding to the first teacher school supply list, checking an online inventory of the first retailer; and,
subsequent to checking the online inventory of the first retailer, automatically displaying during the first shopping session conducted by the first customer using the first retailer's website, without further first customer input, the interactive matching items graphical user interface wherein a first section of the interactive matching items graphical user interface includes only available first retailer products that correspond to items on the first teacher school supply list that will be in the online inventory of the first retailer at a predetermined time before an order of the first customer is to be shipped.

12. The computer system of claim 8, wherein:
the interactive matching items graphical user interface includes a no matching items section identifying all items of the first teacher school supply list for which no match was found; and,
the product identifying information is a UPC code.

13. A method for purchasing school supplies over the Internet, comprising:
providing a computer system for facilitating a first customer's online purchase of school supplies listed on one or more teacher school supply lists using an online store's website, said computer system including a first customer user device, at least a first retailer server that generates a first retailer's website configured to be presented on the first customer user device to the first customer to enable the first customer to directly purchase products from the first retailer over the Internet while interacting with the first customer user device to search the first retailer's website presented to the first customer on the first customer user device, said computer system further including a processor, one or more non-transitory storage mediums and a computer program product having one or more computer executable instructions that when executed by the processor cause the following steps to be performed:
receiving electronically by the processor, from one or more user devices in possession of one or more teachers or teacher designees, one or more teacher school supply lists inputted by the one or more teachers or teacher designees interacting with at least one list submission graphical user interface, each teacher school supply list having one or more generically described items a student of a teacher is required to have for class, wherein each generically described item is described only by its generic term or terms;
subsequent to the processor receiving electronically the one or more teacher school supply lists, indexing, by the processor, products located by the processor on a retailer data server, said products corresponding to each of the one or more generically described items of the one or more teacher school supply lists associating by the processor a retailer's corresponding product with each of the one or more generically described items;
storing, by the processor, in a database each association of a retailer's corresponding product with each of the one or more generically described items;
accessing the first retailer's website by a first customer using the first customer user device during a first shopping session, wherein the first retailer's website is generated by the first retailer server;
performing each of the following steps during the first shopping session conducted by the first customer accessing the first retailer's website by using the first customer user device:
generating the first retailer's website by a first retailer server, and transmitting the website to the first customer user device for presentation to the first customer;
presenting the first retailer's website on the first customer user device to the first customer during the first shopping session of the first customer conducted using the first retailer's website, the presented first retailer's website including one or more teacher list locating graphical user interfaces configured by the first retailer server to allow the first customer to use the teacher list locating graphical user interfaces to locate and select one or more generic teacher school supply lists;
receiving by the first retailer server, from the first customer user device during the first shopping session of the first customer conducted using the first retailer's website, a first customer's interaction with the one or more teacher list locating graphical user interfaces included in the presentation of the first retailer's website on the first customer user device, the first customer's interaction including the first customer locating and selecting a first teacher school supply list by interacting with the one or more teacher list locating graphical user interfaces presented on the first customer user device, wherein the first teacher school supply list located and selected by the first customer includes one or more generically described items a student of a teacher is required to have for class, wherein each generically described item is described only by its generic term or terms;
retrieving, by the processor, from the database during the first shopping session of the first customer conducted by the first customer through interaction with the first retailer's website as presented on the first customer user device, first retailer product information including first retailer products available for purchase from the first retailer that correspond to each item on the first teacher school supply list;
communicating by the processor to the first customer user device, during the first shopping session of the first customer, the first retailer product information including first retailer products available for purchase from the first retailer that correspond to each item on the first teacher school supply list;
subsequent to retrieving, automatically generating by the processor, an interactive matching items graphical user interface identifying all available first retailer products that correspond to items on the first teacher school supply list, the interactive matching items graphical user interface including an interactive add item control that when activated automatically adds all available first retailer products, that correspond to items on the first teacher school supply list, to the first customer's electronic shopping cart;

communicating by the processor to the first customer user device the interactive matching items graphical user interface; and presenting the interactive matching items graphical user interface on the first customer user device to the first customer as an element of the first retailer's website during the first shopping session conducted by the first customer using the first retailer's website, a-n the interactive matching items graphical user interface identifying all available first retailer products that correspond to items on the first teacher school supply list, the interactive matching items graphical user interface including an interactive add item control that when activated by the first customer automatically adds all available first retailer products that correspond to items on the first teacher school supply list to the first customer's electronic shopping cart.

14. The method according to claim 13, wherein:

the interactive matching items graphical user interface includes a first matching items section which includes the following for each available first retailer product that corresponds to an item on the first teacher school supply list: (i) product purchase information; and, (ii) a description of a corresponding item on the first teacher school supply list, wherein the product purchase information is displayed adjacent the description of the corresponding item on the first teacher school supply list.

15. The method of claim 14, further comprising:

displaying on an electronic display of the first customer user device during the first shopping session conducted by the first customer using the first retailer's website, using the processor, an interactive order delivery method selection graphical user interface, the interactive order delivery method selection graphical user interface including a first interactive order delivery method icon corresponding to an order to be picked-up in a store and a second interactive order delivery method icon corresponding to an order to be shipped to a location specified by the first customer, the interactive order delivery method selection graphical user interface being displayed during the first shopping session conducted by the first customer using the first retailer's website and before displaying to the first customer the interactive matching items graphical user interface corresponding to the first teacher school supply list.

16. The method of claim 15, further comprising:

receiving first customer input during the first shopping session conducted by the first customer using the first retailer's web site that the first interactive order delivery method icon has been activated by the first customer;

subsequent to receiving first customer input that the first interactive order delivery method icon has been activated by the first customer, during the first shopping session conducted by the first customer using the first retailer's web site, and before displaying to the first customer the interactive matching items graphical user interface corresponding to the first teacher school supply list, checking an inventory of a first store; and, subsequent to checking an inventory of the first store, automatically displaying during the first shopping session conducted by the first customer using the first retailer's website, without further first customer input, the interactive matching items graphical user interface wherein a first section of the interactive matching items graphical user interface includes only available first retailer products that correspond to items on the first teacher school supply list that will be in the inventory of the first store at a predetermined time before an order of the first customer is to be picked-up.

17. The method of claim 15, further comprising:

receiving first customer input during the first shopping session conducted by the first customer using the first retailer's web site that the second interactive order delivery method icon has been activated by the first customer;

subsequent to receiving user input that the second interactive order delivery method icon has been activated by the first customer and before displaying to the first customer the interactive matching items graphical user interface corresponding to the first teacher school supply list, checking an online inventory of a first retailer; and, subsequent to checking the online inventory of a first retailer, automatically displaying, without further first customer input and during the first shopping session of the first customer conducted using the first retailer's website, the interactive matching items graphical user interface wherein a first section of the interactive matching items graphical user interface includes only available first retailer products that correspond to items on the first teacher school supply list that will be in the online inventory of the first retailer at a predetermined time before an order of the first customer is to be shipped.

18. The method of claim 13, wherein the interactive matching items graphical user interface includes a no matching items section identifying all items of the first teacher school supply list for which no match was found.

19. The method of claim 13, wherein the product identifying information is a UPC code.

20. The method of claim 13, wherein the product purchase information includes at least two of the following: (i) a product image; (ii) a textual description of a product; and, (iii) a product price.

\* \* \* \* \*